United States Patent
Li et al.

(10) Patent No.: US 12,554,765 B2
(45) Date of Patent: Feb. 17, 2026

(54) AUDIO PLAYING METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Yang Li, Beijing (CN); Wei Zhang, Beijing (CN); Zhixin Zhou, Beijing (CN); Gongjin Fang, Beijing (CN); Hongquan Zhu, Beijing (CN); Xi Fan, Beijing (CN); Runzhi Qin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 17/439,360

(22) PCT Filed: Jun. 25, 2021

(86) PCT No.: PCT/CN2021/102514
§ 371 (c)(1),
(2) Date: Sep. 27, 2022

(87) PCT Pub. No.: WO2022/095475
PCT Pub. Date: May 12, 2022

(65) Prior Publication Data
US 2023/0070812 A1    Mar. 9, 2023

(30) Foreign Application Priority Data
Nov. 5, 2020   (CN) .......................... 202011223234.4

(51) Int. Cl.
*G06F 16/438*   (2019.01)
*G06F 16/432*   (2019.01)
(Continued)

(52) U.S. Cl.
CPC ........ *G06F 16/4393* (2019.01); *G06F 16/437* (2019.01)

(58) Field of Classification Search
None
See application file for complete search history.

(56) References Cited

U.S. PATENT DOCUMENTS

| | | | |
|---|---|---|---|
| 6,188,400 B1 * | 2/2001 | House | G06F 9/547 719/313 |
| 8,954,346 B1 * | 2/2015 | Walker | H04N 21/435 705/14.66 |

(Continued)

FOREIGN PATENT DOCUMENTS

| | | |
|---|---|---|
| CN | 102708584 B | 6/2014 |
| CN | 104423870 A | 3/2015 |

(Continued)

OTHER PUBLICATIONS

Chinese Patent Application No. 202011223234.4, First Office Action, 28 pages with English Translation.
(Continued)

*Primary Examiner* — Mustafa A Amin

(57) ABSTRACT

Disclosed embodiments provide an audio playing method, an apparatus, an electronic device and a storage medium. The method invokes a second application in response to an operation on an interface of a first application, and then uses the second application to play a target audio including an audio in a multimedia in the interface of the first application. The disclosed embodiment allows a user to directly listen to the target audio corresponding to the audio included in the multimedia information when browsing the multimedia information on the first application, thereby overcoming a technical problem where the user has to search for the target audio separately or cannot find the target audio due to lack of information about the target audio. By directly invoking (Continued)

the second application to play the target audio, the technical effect of skipping the searching step and improving the user experience is achieved.

20 Claims, 7 Drawing Sheets

(51) Int. Cl.
*G06F 16/435* (2019.01)
*G06F 16/44* (2019.01)
*G06F 16/45* (2019.01)
*H04L 67/133* (2022.01)

(56) References Cited

U.S. PATENT DOCUMENTS

| | | | | |
|---|---|---|---|---|
| 2008/0140433 | A1* | 6/2008 | Levy | H04N 21/47202 |
| | | | | 705/26.1 |
| 2012/0233642 | A1* | 9/2012 | Piatt | H04N 21/47815 |
| | | | | 725/60 |
| 2012/0235633 | A1 | 9/2012 | Kesler et al. | |
| 2013/0065685 | A1* | 3/2013 | Woodcock | G06Q 50/01 |
| | | | | 715/825 |
| 2013/0347018 | A1* | 12/2013 | Limp | H04N 21/4394 |
| | | | | 725/19 |
| 2014/0201655 | A1* | 7/2014 | Mahaffey | G06F 3/04817 |
| | | | | 715/765 |
| 2015/0195264 | A1* | 7/2015 | Finlayson | G06F 21/604 |
| | | | | 726/6 |
| 2015/0301718 | A1 | 10/2015 | Trollope et al. | |
| 2017/0026686 | A1* | 1/2017 | Glazier | H04N 21/41407 |
| 2018/0147483 | A1* | 5/2018 | Osman | A63F 13/5258 |
| 2022/0019631 | A1* | 1/2022 | Katz | G06F 16/958 |

FOREIGN PATENT DOCUMENTS

| | | |
|---|---|---|
| CN | 104598502 A | 5/2015 |
| CN | 106775969 A | 5/2017 |
| CN | 106796651 A | 5/2017 |
| CN | 106873869 A | 6/2017 |
| CN | 106940996 A | 7/2017 |
| CN | 109947979 A | 6/2019 |
| CN | 110007985 A | 7/2019 |
| CN | 110337041 A | 10/2019 |
| CN | 110958470 A | 4/2020 |
| CN | 111125480 A | 5/2020 |
| CN | 111556278 A | 8/2020 |
| CN | 112347273 A | 2/2021 |

OTHER PUBLICATIONS

Second Office Action issued May 19, 2022 in Chinese Patent Application 202011223234.4 (12 pages) with an English translation (3 pages).
International Patent Application No. PCT/CN2021/102514, International Search Report mailed Sep. 13, 2021, 11 pages.

* cited by examiner

AUDIO PLAYING METHOD, APPARATUS, ELECTRONIC DEVICE AND STORAGE MEDIUM

CROSS-REFERENCE TO RELATED APPLICATIONS

This application is a National Stage of International Application No. PCT/CN2021/102514, filed on Jun. 25, 2021, which claims priority to Chinese Patent Application No. 202011223234.4, filed with the CNIPA on Nov. 5, 2020, entitled "AUDIO PLAYING METHOD, APPARATUS, ELECTRONIC DEVICE AND STORAGE MEDIUM". The aforementioned applications are incorporated herein by reference in their entireties.

TECHNICAL FIELD

Embodiments of the present disclosure relate to the technical field of computer and network communication and, in particular, to an audio playing method, an apparatus, an electronic device and a storage medium.

BACKGROUND

When people use smart terminal devices to browse information online in daily life, they often come across audio in the browsed multimedia information, such as background music for a webpage or an article, a fragment of some soundtrack in a movie or short video, and so on.

At present, if a user likes the audio included in the multimedia and wants to obtain the original work corresponding to the audio, e.g., which is a fragment of a soundtrack, the user will have to know the name of the original work and then search separately.

But most of the time, all the user can do is to ask for the name of the original work, i.e., the target audio, only by posting a comment. This approach cannot obtain the target audio promptly. Even if the user does get a respond, it could be incorrect information. Or, when there are multiple versions of the target audio, the user might fail to obtain the version corresponding to the multimedia.

SUMMARY

Embodiments of the present disclosure provide an audio playing method, an apparatus, an electronic device and a storage medium to overcome the technical problem in the prior art that a target audio corresponding to an audio included in a multimedia cannot be directly listened to when multimedia information is browsed.

In a first aspect, an embodiment of the present disclosure provides an audio playing method, including:
invoking a second application in response to an operation on an interface of a first application, where the interface is used to present an audio in a multimedia, and the multimedia includes an information set that includes an audio and other non-audio media; and
playing a target audio using the second application, where the target audio has a corresponding relationship with the audio in the multimedia.

In a second aspect, an embodiment of the present disclosure provides an audio playing apparatus, including:
an acquiring module, configured to acquire an operating instruction on an interface of a first application, where the interface is used to show an audio in a multimedia, and the multimedia includes an information set that includes an audio and other non-audio media;
a processing module, configured to invoke a second application in response to the operating instruction; and
the processing module is further configured to play a target audio using the second application, where the target audio has a corresponding relationship with the audio in the multimedia.

In a third aspect, an embodiment of the present disclosure provides an electronic device, including:
at least one processor; and a memory, where
the memory stores computer executable instructions; and
the at least one processor executes the computer-executable instructions stored in the memory to enable the at least one processor to execute the audio playing method according to the above first aspect and various possible designs thereof.

In a fourth aspect, an embodiment of the present disclosure provides a computer-readable storage medium, storing thereon computer-executable instructions which, when being executed by a processor, implement the audio playing method according to the above first aspect and various possible designs thereof.

In a fifth aspect, an embodiment of the present disclosure provides a computer program product including a computer program stored in a computer readable storage medium, and at least one processor of an electronic device is enabled to read from the computer readable storage medium the computer program which, when executed by the at least one processor, enables the at least one processor to implement the audio playing method according to the above first aspect and various possible designs thereof.

In a sixth aspect, an embodiment of the present disclosure provides a computer program stored in a computer-readable storage medium, and at least one processor of a device is enabled to read the computer program from the computer-readable storage medium. The at least one processor executes the computer program to enable the at least one processor to execute the audio playing method according to the above first aspect and various possible designs thereof.

Disclosed embodiments provide an audio playing method, an apparatus, an electronic device and a storage medium. The method invokes a second application in response to an operation on an interface of a first application, and then uses the second application to play a target audio including an audio in a multimedia in the interface of the first application. The disclosed embodiments allow a user to directly listen to the target audio corresponding to the audio included in the multimedia information when browsing the multimedia information on the first application, thereby overcoming a technical problem where the user has to search for the target audio separately or cannot find the target audio due to lack of information about the target audio. By directly invoking the second application to play the target audio, the technical effect of skipping the searching step and improving the user experience is achieved.

BRIEF DESCRIPTION OF THE DRAWINGS

In order to more clearly illustrate the embodiments of the present disclosure or the technical solutions in the prior art, the drawings required in describing the embodiments or the prior art will be briefly introduced below. Apparently, the drawings described in the following are for some embodiments of the present application, and other drawings can be obtained by those skilled in the art from these drawings without paying any creative labor.

DESCRIPTION OF EMBODIMENTS

In order to make objectives, technical solutions and advantages of embodiments of the present disclosure clearer, the technical solutions in the embodiments of the present disclosure will be described hereunder clearly and comprehensively with reference to accompanying drawings of the embodiments of the present disclosure. Obviously, the described embodiments are only a part of embodiments of the present disclosure, rather than all of them. Based on the embodiments in the present disclosure, any and all other embodiments devised by those of ordinary skill in the art without paying creative work, including but not limited to combinations of multiple embodiments, fall within the protection scope of the present disclosure.

The terms "first", "second", "third", "fourth", etc. (if present) in the specification and claims of the present disclosure and the aforementioned drawings are used to distinguish similar objects without necessarily describing any specific sequence or order. It is to be understood that the number used as such may be interchanged as appropriate, as long as the embodiments of the disclosure described herein can be implemented, for example, in a sequence other than those illustrated or described herein. In addition, the terms "include" and "comprise" and their variations in any form are intended to cover a non-exclusive inclusion. For example, a process, method, system, product or device that "includes" a series of steps or units is not necessarily limited to those explicitly listed steps or units. Rather, they may include other steps or units not explicitly listed or inherent to such process, method, system, product or device.

Figure 1:
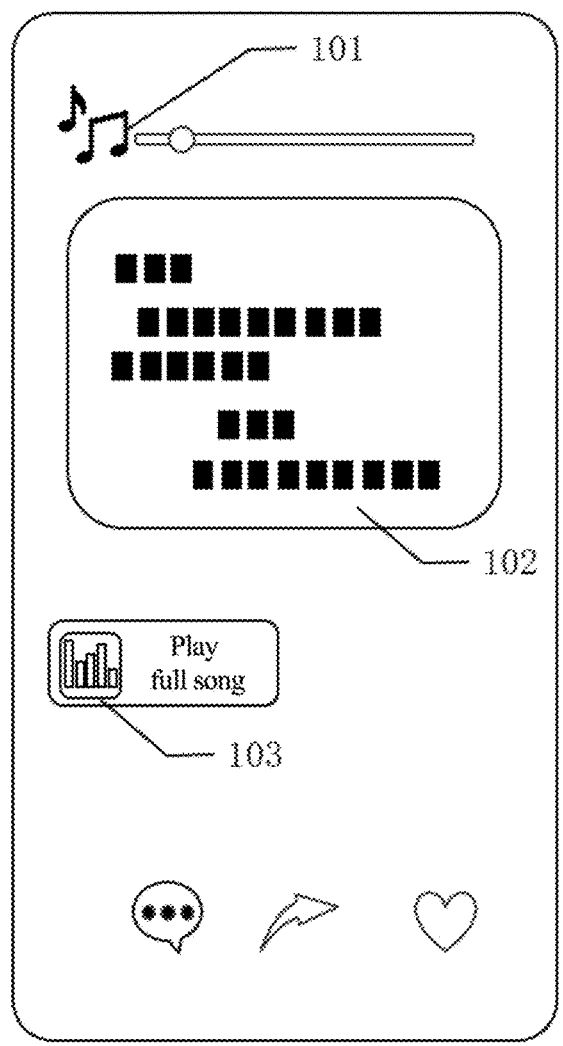
FIG. 1 is a schematic diagram of an application scenario of an audio playing method provided by an embodiment of the disclosure.

Reference is made to FIG. 1, which is a schematic diagram of an application scenario of an audio playing method provided by an embodiment of the disclosure. FIG. 1 illustrates a multimedia browsing interface of a video playing application or a music playing application or a social software on a mobile phone. The interface includes background music 101, non-audio media information 102, and a target audio playing control 103. The background music 101 may be presented in the form of a control, or may be not presented, i.e., be hidden in the backend to play the audio.

The non-audio media information 102 may be at least one type of medium, such as an image, a text, a video, and a short video.

In the prior art, when a user browsing a multimedia is attracted by an audio, e.g., background music, included in the multimedia but does not know any information about the background music, the user will have to ask around, or post a comment, hoping to solicit a reply from other users in order to know the full version or full soundtrack, i.e., the target audio, corresponding to the background music, such that the user can not get the target audio promptly and conveniently.

To solve this problem, the present application introduces a target audio playing control 103. The user can play the target audio corresponding to the audio of the background music 101 by operating the target audio playing control 103, such as clicking, double-clicking, or sliding along a preset trajectory. It provides a simple operating method for the user to listen to the target audio, and solves the technical problem in the prior art that a target audio corresponding to an audio included in a multimedia cannot be directly listened to when multimedia information is browsed. Now, an audio playing method provided by an embodiment of the present disclosure will be detailed with reference to FIG. 2.

Figure 2:
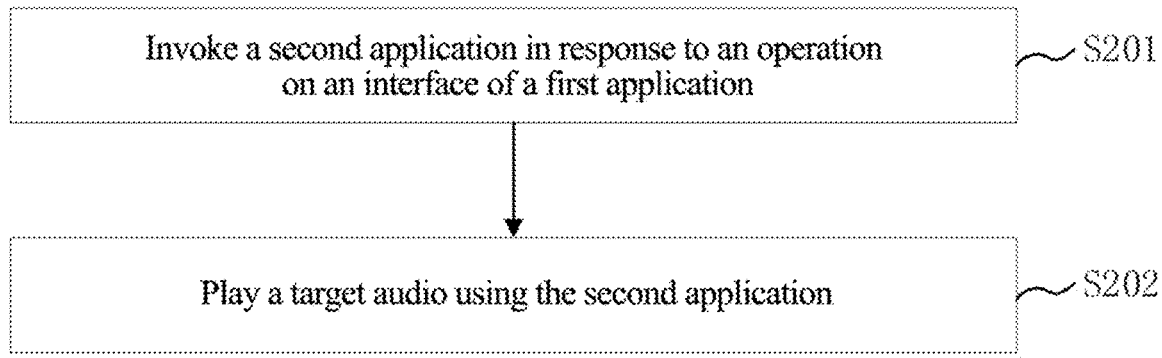
FIG. 2 is a first schematic flowchart of an audio playing method provided by an embodiment of the present disclosure.

Reference is made to FIG. 2, which is a first schematic flowchart of an audio playing method provided by an embodiment of the present disclosure. The method of this embodiment is applied to a terminal device on the user side and/or a server, the audio playing method including:

S201: invoking a second application in response to an operation on an interface of a first application.

In this step, the interface is used to present an audio in a multimedia, and the multimedia includes an information set that includes an audio and other non-audio media.

In this embodiment, the second application is an audio playing application.

In a possible embodiment, the invoking the second application includes: invoking the second application in the backend of the user side, playing the audio in the multimedia and, at the same time, turning off the audio output in the first application. That is, the current interface on the user side still remains in the first application, so that the user can continue browsing other information in the multimedia of the first application, and invoke the second application in the backend to play the target audio.

In another possible embodiment, the invoking the second application includes: invoking the second application, from the first application. That is, the current interface of the user terminal invokes the second application from the first application.

It should be noted that an operation on the interface of the first application includes: clicking the audio playing control, double-clicking the audio playing control, sliding the audio playing control along a preset trajectory, tilting the user terminal by a preset angle, shaking the user terminal in the current interface, vocally input a playing instruction (e.g., "Play full song") and so on.

S202: playing a target audio using the second application.

In this step, the target audio includes an audio in the multimedia shown in the first application.

For example, when the multimedia is a short video and the background music in the short video is an audio clip cut from some music, the target audio is the full version corresponding to the audio clip.

According to the audio playing method provided in the disclosed embodiment, a second application is invoked in response to an operation on an interface of a first application, and then the second application is used to play a target audio including an audio in a multimedia in the interface of the first application. The disclosed embodiment allows a user to directly listen to the target audio corresponding to the audio included in the multimedia information when browsing the multimedia information on the first application, thereby overcoming a technical problem where the user has to search for the target audio separately or cannot find the target audio due to lack of information about the target audio. By directly invoking the second application to play the target audio, the technical effect of skipping the searching step and improving the user experience is achieved.

Figure 3:
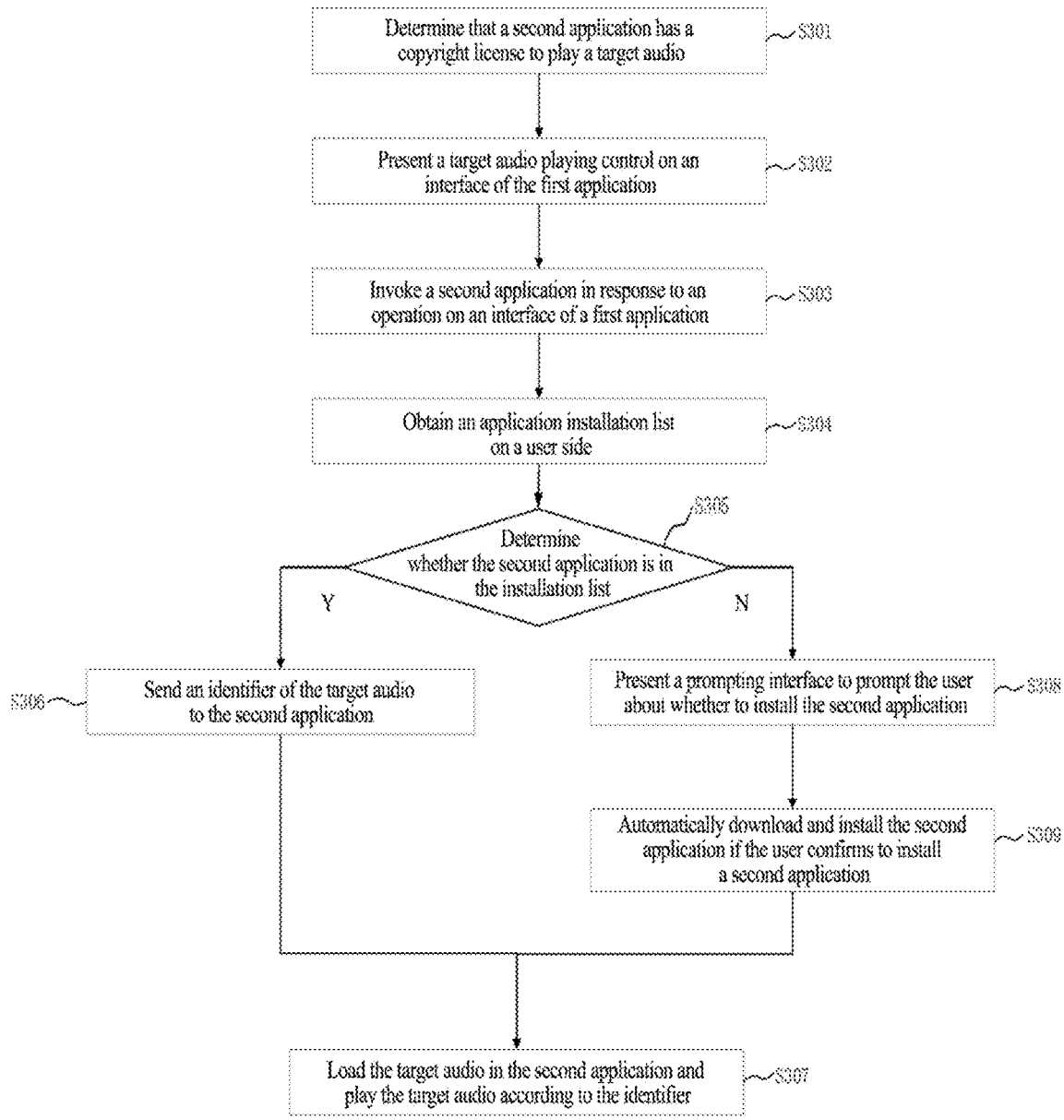
FIG. 3 is a second schematic flowchart of an audio playing method provided by an embodiment of the present disclosure.

Reference is made to FIG. 3, which is a second schematic flowchart of an audio playing method provided by an embodiment of the present disclosure. The method of this embodiment is applied to a terminal device on the user side and/or a server, the audio playing method including:

S301: determining that a second application has a copyright license to play a target audio.

This step specifically includes:
  acquiring an audio in a multimedia being shown on a first application;
  determining an identifier of the target audio according to the audio; and
  determining that the target audio is in a licensed audio library of the second application according to the identifier.

Specifically, information attached to the audio in the multimedia can be used as the identifier of the target audio. For example, when a multimedia is uploaded to a server, the attached audio information, e.g., music title, music writer, singer, link to the full version, etc., has been enclosed.

Alternatively, the audio in the multimedia may be extracted to form a separate audio file that is then uploaded to a server, and audio fingerprint matching is performed by the server. That is, the fingerprint feature of the audio is compared (i.e., the identifier is identified) using a licensed music library of the server corresponding to the first application or the second application, thus identifying the target audio.

The effect of this step is to ensure that the target audio corresponding to the audio in the multimedia, such as the full version, is licensed to be played in the second application, thus preparing the authentication for the subsequent playing of the target audio.

In a possible design, the second application does not have the copyright license to play the target audio, that is, the corresponding target audio cannot be found in the licensed audio library according to the identifier of the target audio. In this case, a third application can be tested for the license to play.

S302: presenting a target audio playing control on an interface of the first application.

In this step, when the second application has the license to play the target audio, the presenting the target audio playing control specifically includes:
  highlighting the target audio playing control; or
  flashing the target audio playing control at a preset frequency; or
  presenting the target audio playing control during a preset interval, and hiding the target audio playing control when the preset interval expires; or
  cyclically presenting relevant attribute information of the target audio on the control according to a preset order, such as the title, singer, music writer, album title, resource link, and associated media playing link or the like of the target audio.

In this embodiment, the target audio playing control includes an icon for presenting at least one attribute of the target audio, the attribute including at least one of: number of likes, number of plays, album, popularity, ranking, lyrics and/or music by, and performer.

Further, the target audio playing control further includes: texts or characters for prompting the function of the target audio playing control, or for presenting the relevant attribute information of the target audio. In a possible design, the texts or characters can be presented only after the user has taken a preset operation on the icon, such as a long press on the icon, double-clicking the icon, sliding the icon along a preset trajectory, and so on.

Figure 4A:
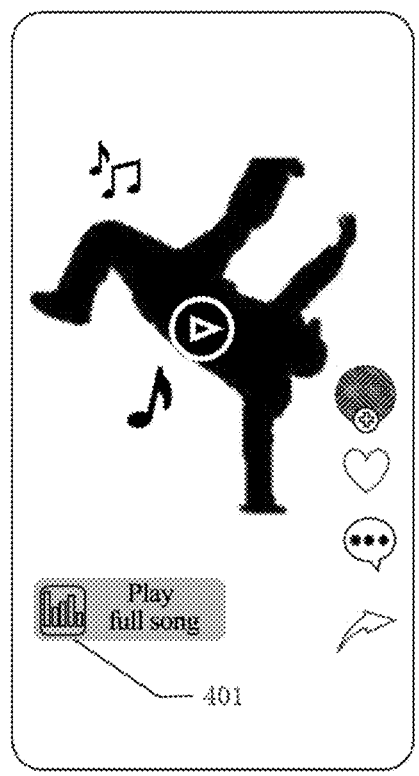
FIGS. 4a-4c are schematic diagrams of interfaces of a first application provided by an embodiment of the present disclosure.
Figure 4B:
Figure 4C:
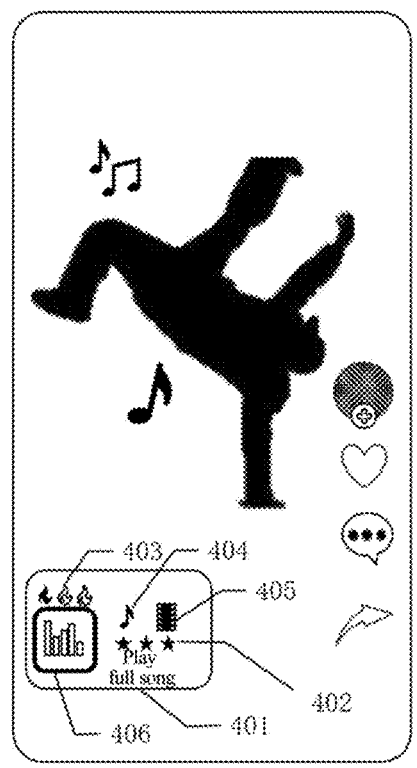

Reference is made to FIGS. 4a-4c, which are schematic diagrams of interfaces of a first application provided by an embodiment of the present disclosure. As shown in FIG. 4a, when a short video is being played on the interface of the first application and the user side detects that the second application has the copyright license to play the full version corresponding to the background music of the short video, the target audio playing control 401 changes the background color of the icon to highlight it. In an embodiment, as shown in FIG. 4b, the target audio playing control 401 can, alternatively, be presented on the interface when the interface of the first application pauses playing the short video. Or, the target audio playing control 401 can be presented when the multimedia shown on the interface, such as a short video, has been repeatedly played for a preset number of times. Or, the target audio playing control 401 can be presented when the audio in the multimedia shown on the interface has been repeatedly played for a preset number of times.

In an embodiment, the icon of the target audio playing control is further used to present the characteristic attribute of the target audio by at least one of: color, shape, and number of icons, where the characteristic attribute includes: sound quality and category. The category includes: genre (folk, pop, jazz, etc.), song, or song with video (such as MV), etc.

As shown in FIG. 4c, a certain multimedia such as a short video is presented on a first program interface on the user terminal. The target audio playing control 401 is presented in the area of the interface, or it can be superimposed over the multimedia. The target audio playing control 401 includes: a sound quality mark 402, a popularity mark 403, a music mark 404, a music video mark 405, and a jump anchor 406. The sound quality marker 402 uses the number and/or color of the stars to reflect whether the target audio is of standard sound quality or high-definition sound quality or lossless sound quality. The music marker 404 and music video marker 405 are used to indicate the category to which the target audio belongs, such as music or music with video, such as MV. The popularity marker 403 is used to indicate the number of listens, or the number of likes, or the number of purchases, or the hit list ranking of the target audio.

In a possible design, if the second application does not have the copyright license to play the target audio, the target audio playing control is hidden or presented in gray. For expiration of the license to play the target audio, or for facilitating the user to know the relevant information about the target audio, a grayed out target audio playing control can still be clicked by the user to obtain the relevant information of the target audio, so that the user can obtain the target audio from other streaming media.

S303: invoking a second application in response to an operation on an interface of a first application.

In this embodiment, the interface of the first application includes a multimedia presenting area and the target audio playing control, where the multimedia presenting area is used to present at least one of the multimedia, and the operation on the interface of the first application includes: operating the target audio playing control. The operation includes clicking, double-clicking, or sliding, or sliding or displacing the audio playing control along a preset trajectory.

Specifically, for different first applications or different interfaces, the presentation forms of multimedia are different. For example, the interface of the first application is a multimedia search interface, and the multimedia includes at least one of: audio, video, short video, text material including background music, and web page contents including audio and/or video.

Figure 5A:
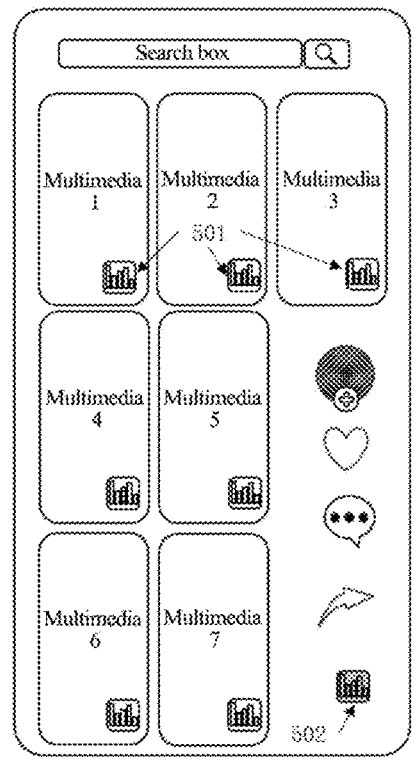
FIGS. 5a-5b are schematic diagrams of interfaces of a first application provided by an embodiment of the present disclosure.
Figure 5B:
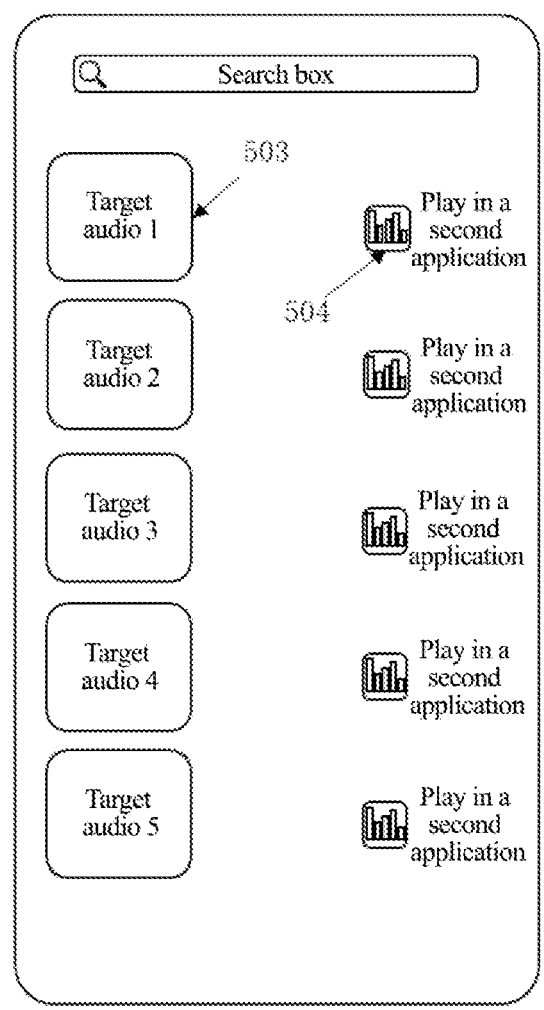

Reference is made to FIGS. 5a-5b, which are schematic diagrams of interfaces of a first application provided by an embodiment of the present disclosure. In the search interface of the first application, a keyword is entered in a search box, the search button is clicked, and the first application can list and show relevant multimedia. As shown in FIG. 5a, when the name of the author is entered, the search result will list multiple multimedia, such as short videos, published by the same author, with each multimedia presenting area being superimposed by, and presented with, the target audio playing control 501 corresponding to the audio in the multimedia. In an embodiment, the title of the target audio can also be entered in the search box. The interface lists multiple short videos, i.e., multimedia, with the same target audio as the background music. In this case, it is possible to present only one target audio playing control 502. After the user clicks the target audio playing control 501 or the target audio playing control 502, the user terminal invokes a second application to play the target audio with the license to play. It should be noted that the invoking can be done as a backend call, or a direct jump to present the second application for playing.

As shown in FIG. 5b, a search keyword is directly entered in the search box, and the first application lists related target audio icons 503 in a vertical arrangement, with a second application jump anchor 504 being presented in the same row of each target audio. After the user clicks the jump anchor 504, the second application is directly invoked to play the target audio.

S304: obtaining an application installation list on a user side.

S305: determining whether the second application is in the installation list.

In steps S304-S305, after receiving an invoking instruction triggered by the target audio playing control of the first application, the user side first checks whether the second application has been installed in the user side, and therefore needs to obtain the application installation list. If the second application has been installed on the user side, step S306 is executed and, if it is not installed, step S308 is executed.

S306: if yes, sending an identifier of the target audio to the second application.

S307: loading the target audio in the second application and playing the target audio according to the identifier.

In this step, the second application searches for the corresponding target audio in a licensed target audio library according to the identifier, and then transmits the target audio through the network and downloads it to the user terminal for playing.

S308: if not, presenting a prompting interface to prompt the user about whether to install the second application.

In this step, if the second application is not in the installation list, a prompting interface of whether to download the second application is presented in the interface of the first application.

In a possible design, if not, an applet of the second application is launched through the first application, and the target audio is played in the applet.

S309: automatically downloading and installing the second application, if the user confirms to install the second application.

According to the audio playing method provided in the disclosed embodiment, a second application is invoked in response to an operation on an interface of a first application, and then the second application is used to play a target audio including an audio in a multimedia in the interface of the first application. The disclosed embodiment allows a user to directly listen to the target audio corresponding to the audio included in the multimedia information when browsing the multimedia information on the first application, thereby overcoming a technical problem where the user has to search for the target audio separately or cannot find the target audio due to lack of information about the target audio. By directly invoking the second application to play the target audio, the technical effect of skipping the searching step and improving the user experience is achieved.

Figure 6:
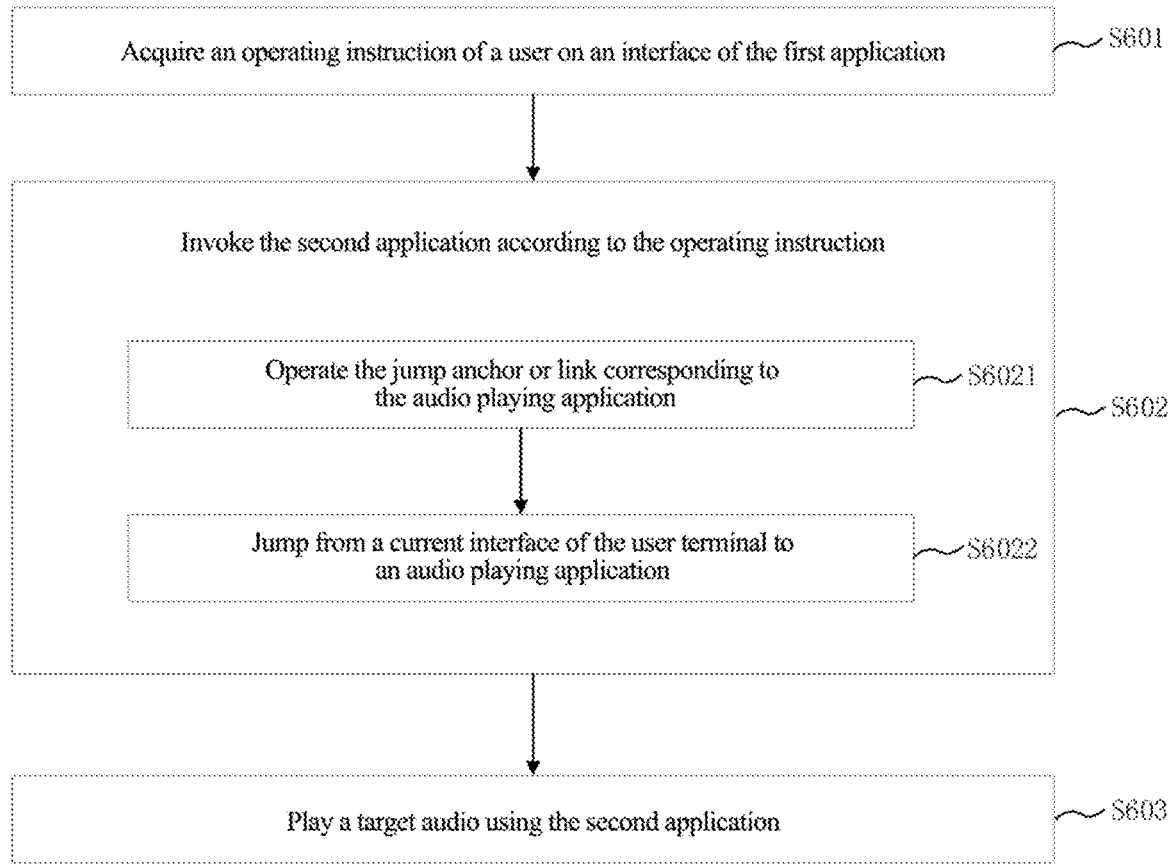
FIG. 6 is a third schematic flowchart of an audio playing method provided by an embodiment of the present disclosure.

Reference is made to FIG. 6, which is a third schematic flowchart of an audio playing method provided by an embodiment of the present disclosure. The method of this embodiment is applied to a terminal device on the user side and/or a server, the audio playing method including:

S601: acquiring an operating instruction of a user on an interface of the first application.

In this step, when browsing multimedia information such as short videos using the first application, the user gets attracted by the audio included in the multimedia information, the user can click the target audio playing control on the interface to trigger the invoking operation instruction of the second application.

S602: invoking the second application according to the operating instruction.

In this embodiment, when the second application includes at least two audio playing applications, the target audio playing control on the interface of the first application includes a jump anchor or link for each of the audio playing applications.

S6021: operating the jump anchor or link corresponding to the audio playing application.

In this step, the user can click the jump anchor or link corresponding to any of the audio playing applications to trigger the jump or backend invoking of the corresponding audio playing application. It is understandable that different operating modes can be provided for different applications. For example, the first audio playing application can be invoked with one click, and the second audio playing application can be invoked with two clicks. In this case, the two audio playing applications can share the same invoking icon, i.e., the jump anchor or link, so as to prevent too many jump anchors or links from occupying too much area on the interface. Further, different operating methods can be provided for different invoking methods, such as single-click for backend invoking, and double-click for interface jumping to the audio playing application.

S6022: jumping from a current interface of the user terminal to an audio playing application.

In this step, the current user terminal jumps to the corresponding audio playing application according to the jump instruction given by the user. If the user clicks the jump anchor of the first audio playing application, the current interface of the user terminal jumps to the playing interface of the first audio playing application. If the user clicks the jump anchor of the second audio playing application, then the current interface of the user terminal jumps to the playing interface of the second audio playing application.

In a possible design, the target audio playing control includes multiple user terminal jump anchors or links, with each user terminal having a second application installed. In this step, the specific steps include:

operating a user terminal jump anchor or link; and jumping from a current interface of a corresponding user terminal to the audio playing application.

For example, in the current interface presented on the user terminal where the first application is located, the target audio playing control includes two user terminal jump anchors, e.g., one representing the current user terminal and the other representing a smart speaker. When the user clicks on a corresponding user terminal jump anchor, the corresponding user terminal will jump to the second application to play the target audio. In this way, when browsing multimedia in one terminal, another terminal can be conveniently and quickly used to play the target audio corresponding to the audio in the multimedia, thereby improving the user experience.

S603: playing a target audio using the second application.

In this step, the target audio includes an audio in the multimedia presented in the first application.

For example, when the multimedia is a short video and the background music in the short video is an audio clip cut from some music, the target audio is the full version corresponding to the audio clip.

According to the audio playing method provided in this embodiment, a second application is invoked in response to an operation on an interface of a first application, and then the second application is used to play a target audio including an audio in a multimedia in the interface of the first application. In this embodiment, multiple audio playing application icons or multiple terminal icons are provided in the target audio playing control on the interface of the first application to enable the user to freely and conveniently select the desired audio playing application or the target audio playing terminal, thus eliminating the need of the user to additionally launch multiple audio playing applications or separately launch other user terminals such as smart speakers to play the target audio, which will involve complicating operations, thereby improving the user experience.

It should be noted that in the foregoing embodiments, the first application is a program including a short video playing application, and the second application includes an audio playing application.

Figure 7:
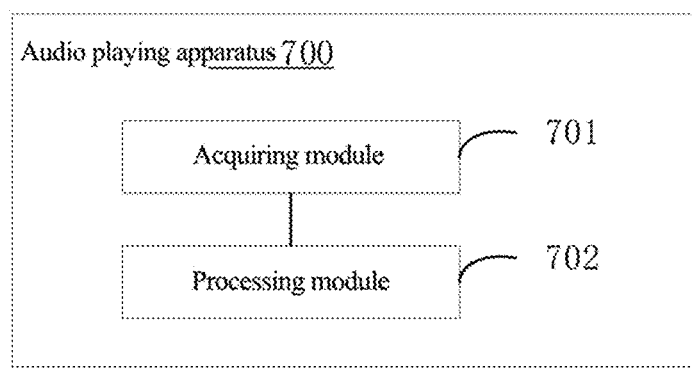
FIG. 7 is a structural block diagram of a user side audio playing apparatus provided by an embodiment of the disclosure.

Corresponding to the audio playing method of the above embodiment, FIG. 7 is a structural block diagram of a user side audio playing apparatus provided by an embodiment of the disclosure. For ease of description, only parts related to the embodiments of the present disclosure are shown. Referring to FIG. 7, the apparatus includes:

an acquiring module 701, configured to acquire an operating instruction on an interface of a first application, where the interface is used to present an audio in a multimedia, and the multimedia includes an information set that includes an audio and other non-audio media;

a processing module 702, configured to invoke a second application in response to the operating instruction; and the processing module 702 is further configured to play a target audio using the second application, where the target audio has a corresponding relationship with the audio in the multimedia.

In an embodiment of the present disclosure, the processing module 702 is configured to invoke the second application, including: invoking the second application in a backend of a user side.

In an embodiment of the present disclosure, the processing module 702 is configured to invoke the second application, including: jumping to the second application.

In an embodiment of the present disclosure, the interface includes a multimedia presenting area and a target audio playing control, the multimedia presenting area is used to present at least one of the multimedia, and the operating instruction includes: operating instruction corresponding to operating the target audio playing control.

In an embodiment of the present disclosure, before the processing module 702 is configured to respond to the operating instruction, it further includes:

The processing module 702 is further configured to determine that the second application has the copyright license to play the target audio.

In an embodiment of the present disclosure, after the processing module 702 is further configured to determine that the second application has the copyright license to play the target audio, it further includes:

the processing module 702 is further configured to present the target audio playing control on the interface of the first application.

In an embodiment of the present disclosure, the processing module 702 is further configured to present the target audio playing control, including:

highlighting the target audio playing control; or flashing the target audio playing control at a preset frequency; or presenting the target audio playing control during a preset interval, and hiding the target audio playing control when the preset interval expires; or cyclically presenting relevant attribute information of the target audio according to a preset order.

In an embodiment of the present disclosure, when the second application includes at least two audio playing applications, the target audio playing control includes a jump anchor or link for each of the audio playing applications.

In an embodiment of the present disclosure, each of the audio playing applications is installed on a different user terminal, and the processing module 702 is configured to invoke a second application in response to the operating instruction, including:

operating the jump anchor or the link corresponding to the audio playing application; and jumping from a current interface of a corresponding user terminal to the audio playing application.

In an embodiment of the present disclosure, the target audio playing control includes multiple user terminal jump anchors or links, each user terminal is installed with the second application, and the processing module 702 is configured to invoke a second application in response to the operating instruction, including:

operating the user terminal jump anchor or link; and jumping from a current interface of a corresponding user terminal to the audio playing application.

In an embodiment of the present disclosure, before the processing module 702 is configured to respond to the operating instruction, it further includes:

If the second application does not have the copyright license to play the target audio, the processing module 702 is further configured to hide the target audio playing control or present the target audio playing control in gray.

In an embodiment of the present disclosure, the processing module 702 is further configured to determine that the second application has the copyright license to play the target audio, including:

the acquiring module 701 is further configured to acquire the audio in the multimedia;

the processing module 702 is further configured to determine an identifier of the target audio according to the audio;

the processing module 702 is further configured to determine that the target audio is in a licensed audio library of the second application according to the identifier.

In an embodiment of the present disclosure, before the processing module 702 is further configured to play the target audio using the second application, it further includes:

the processing module 702 is further configured to obtain an application installation list on a user side;

the processing module 702 is further configured determine whether the second application is in the installation list and, if yes, send the identifier of the target audio to the second application; and Correspondingly, the processing module 702 is further configured to play the target audio second application, including:

the processing module 702 is further configured to load the target audio in the second application and play the target audio according to the identifier.

In an embodiment of the present disclosure, after the determining whether the second application is in the installation list, it further includes:

if not, the processing module 702 is further configured to present a prompting interface to prompt a user about whether to install the second application;

if the user determines to install the second application, the processing module 702 is further configured to automatically download and install the second application.

In an embodiment of the present disclosure, after the processing module 702 is further configured to determine whether the second application is in the installation list, it further includes:

if not, the processing module 702 is further configured to launch an applet of the second application through the first application; and play the target audio in the applet.

In an embodiment of the present disclosure, the target audio playing control includes an icon for presenting at least one attribute of the target audio, the attribute including at least one of: number of likes, number of plays, album, popularity, ranking, lyrics and/or music by, and performer.

In an embodiment of the present disclosure, the icon is further used to present the characteristic attribute of the target audio by at least one of: color, shape, and number of icons, where the characteristic attribute includes: sound quality and category.

In an embodiment of the present disclosure, the first application is a program including a short video playing application, and the second application includes an audio playing application.

In an embodiment of the present disclosure, the multimedia includes at least one of: audio, video, short video, text material including background music, and web page contents including audio and/or video.

In an embodiment of the present disclosure, the interface of the first application is a search interface for multimedia.

The apparatus 700 provided in this embodiment can be used to execute the user side-related steps in the technical solutions of the foregoing method embodiments with similar implementation principles and technical effects, which will not be repeated herein.

Figure 8:
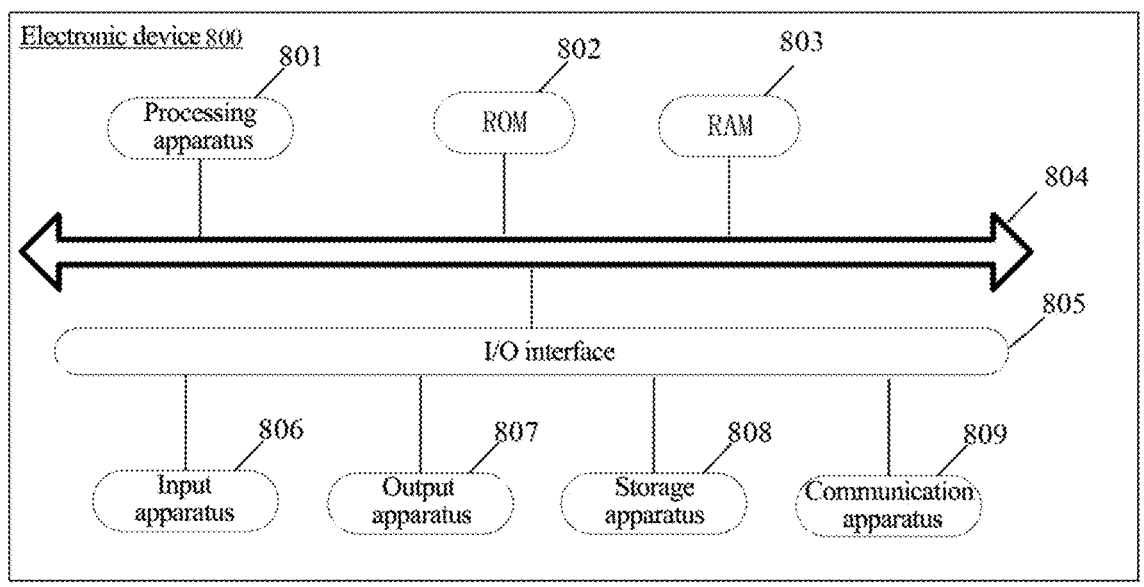
FIG. 8 is a schematic diagram of a hardware structure of an electronic device provided by an embodiment of the disclosure.

Reference is made to FIG. 8, which shows a schematic structural diagram of an electronic device 800 suitable for implementing embodiments of the present disclosure. The electronic device 800 may be a terminal device or a server. The terminal device may include, but is not limited to, mobile terminals, such as mobile phones, notebook computers, digital broadcast receivers, personal digital assistants (Personal Digital Assistant, PDA), tablet computer (Portable Android Device, PAD), portable multi-music player (Portable Media Player, PMP), in-vehicle terminal (such as car navigation terminal), etc., and fixed terminals, such as digital TV (Television), desktop computers, etc. The electronic device shown in FIG. 8 is only an example, and should not impose any limitation over the function or scope of use of the embodiments of the present disclosure.

As shown in FIG. 8, the electronic device 800 may include a processing apparatus (such as a central processor, a graphics processor, etc.) 801 that can, based on a program stored in a read only memory (Read Only Memory, ROM) 802 or loaded from a storage device 808 into a random access memory (Random Access Memory, RAM) 803, perform various appropriate actions and processes. In the RAM 803, various programs and data required for the operation of the electronic device 800 are also stored. The processing unit 801, the ROM 802, and the RAM 803 are inter-connected via a bus 804. An input/output (Input/output, I/O) interface 805 is also connected to the bus 804.

Typically, the following apparatuses can be connected to the I/O interface 805: an input apparatus 806, including, e.g., a touch screen, a touch panel, a keyboard, a mouse, a camera, a microphone, an accelerometer, a gyroscope, etc.; an output apparatus 807, including, e.g., a liquid crystal display (Liquid Crystal Display, LCD), a speaker, a vibrator, etc.; a storage apparatus 808, including, e.g., a magnetic tape, a hard disk, etc.; and a communication apparatus 809. The communication apparatus 809 can allow the electronic device 800 to perform wireless or wired communication with other devices to exchange data. Although FIG. 8 has shown the electronic device 800 having various apparatuses, it should be understood that not all illustrated apparatuses have to be implemented or provided. There can alternatively be implemented or provided with more or fewer apparatuses.

In particular, according to an embodiment of the present disclosure, the procedures described above with reference to the flowcharts can be implemented as a computer software program. For example, an embodiment of the present disclosure includes a computer program product, which includes a computer program carried on a computer-readable medium, and the computer program includes program codes for executing the method shown in the flowcharts. In such an embodiment, the computer program can be downloaded and installed from the network through the communication apparatus 809, or installed from the storage apparatus 808, or installed from the ROM 802. When the computer program is executed by the processing apparatus 801, the above-mentioned functions defined in the methods of the embodiments of the present disclosure are executed.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or element, or a combination of any of the above. More specific examples of the computer-readable storage media may include, but are not limited to: electrical connections with one or more wires, portable computer disks, hard disks, random access memory (RAM), read-only memory (ROM), erasable programmable read only memory (Electrical programmable read only memory, EPROM or flash memory), optical fiber, portable compact disc read only memory (Compact disc read only memory, CD-ROM), optical storage device, magnetic storage device, or any suitable combination of the above. In the present disclosure, the computer-readable storage medium may be any tangible medium that includes or stores a program, and the program can be used by or in combination with an instruction execution system, device, or element. In the present disclosure, the computer-readable signal medium may include a data signal propagated in a baseband or as a part of a carrier, in which computer-readable program codes are carried. The data signal propagating as such can be done in many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, device, or element. The program codes included on the computer-readable medium can be transmitted via any suitable medium, including but not limited to: a wire, an optical cable, radio frequency (Radio Frequency, RF), etc., or any suitable combination of the above.

The above-mentioned computer-readable medium may be included in the above-mentioned electronic device, or may exist alone without being assembled into the electronic device.

The foregoing computer-readable medium carries one or more programs which, when being executed by the electronic device, enables the electronic device to execute the method shown in the foregoing embodiments.

The computer program codes used to perform the operations of the present disclosure may be written in one or more programming languages or a combination thereof. The above-mentioned programming languages include object-oriented programming languages such as Java, Smalltalk, C++, and also conventional procedural programming languages, such as "C" or similar programming language. The program code can be executed entirely on the user's computer, partly on the user's computer, or as an independent software package, or partly on the user's computer and partly on a remote computer, or entirely executed on the remote computer or server. In the case of a remote computer, the remote computer can be connected to the user's computer through any kind of network, including a local area network (Local Area Network, LAN) or a wide area network (Wide Area Network, WAN), or, can be connected to an external computer (for example, to connect via the Internet using an Internet service provider).

The flowcharts and block diagrams in the accompanying drawings illustrate the architectures, functions, and operations possibly implemented by the systems, methods, and computer program products according to various embodiments of the present disclosure. In this regard, each block in the flowchart or block diagram may represent a part of a module, a program segment, or codes, and the part of the module, the program segment or codes includes one or more executable instructions for realizing a particular logic function. It should also be noted that, in some alternative implementations, the functions annotated in the blocks may also occur in a different order from the order labeled in the drawings. For example, two blocks shown in succession can actually be executed substantially in parallel, and they can sometimes be executed in a reverse order, depending on the functions involved. It should also be noted that individual blocks and the combinations thereof in the block diagrams and/or flowcharts can be implemented by a dedicated hardware-based system that performs the specified functions or operations, or be realized by a combination of dedicated hardware and computer instructions.

The units involved in the embodiments described in the present disclosure can be implemented in software or hardware form. The naming of a unit does not constitute a limitation on the unit itself under certain circumstances. For example, the first acquiring unit can also be described as "a unit for obtaining at least two Internet Protocol addresses".

The functions described hereinabove may be performed at least in part by one or more hardware logic components. For example, without limitation, exemplary types of hardware logic components that can be used include: Field Programmable Gate Array (Field Programmable Gate Array, FPGA), Application Specific Integrated Circuit (Application Specific Integrated Circuit, ASIC), and Application Specific Standard Products (Application Specific Standard Product, ASSP), System On Chip (System On Chip, SOC), Complex Programmable Logic Device (Complex Programmable Logic Device, CPLD), etc.

In the context of this disclosure, a machine-readable medium may be a tangible medium, which can include or store a program for use by, or in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In a first aspect, according to one or more embodiments of the present disclosure, an audio playing method is provided, including:

invoking a second application in response to an operation on an interface of a first application, where the interface is used to present an audio in a multimedia, and the multimedia includes an information set that includes an audio and other non-audio media; and playing a target audio using the second application, where the target audio has a corresponding relationship with the audio in the multimedia.

According to one or more embodiments of the present disclosure, the invoking the second application includes: invoking the second application in a backend of a user side.

According to one or more embodiments of the present disclosure, the invoking the second application includes: jumping to the second application.

According to one or more embodiments of the present disclosure, the interface includes a multimedia presenting area and a target audio playing control, where the multimedia presenting area is used to present at least one of the multimedia, and the operation on the interface of first application includes: operating the target audio playing control.

According to one or more embodiments of the present disclosure, before the respond to the operation on the interface of the first application, it further includes:
  determining that the second application has a copyright license to play the target audio.

According to one or more embodiments of the present disclosure, after determining that the second application has the copyright license to play the target audio, it further includes:
  presenting the target audio playing control on the interface of the first application.

According to one or more embodiments of the present disclosure, the presenting the target audio playing control includes:
  highlighting the target audio playing control; or
  flashing the target audio playing control at a preset frequency; or
  presenting the target audio playing control during a preset interval, and hiding the target audio playing control when the preset interval expires; or
  cyclically presenting relevant attribute information of the target audio according to a preset order.

According to one or more embodiments of the present disclosure, when the second application includes at least two audio playing applications, the target audio playing control includes a jump anchor or link for each of the audio playing applications.

According to one or more embodiments of the present disclosure, each of the audio playing applications is installed on a different user terminal, and the invoking the second application in response to the operation on the interface of the first application includes:
  operating the jump anchor or the link corresponding to the audio playing application; and
  jumping from a current interface of a corresponding user terminal to the audio playing application.

According to one or more embodiments of the present disclosure, the target audio playing control includes multiple user terminal jump anchors or links, and each user terminal is installed with the second application, and the invoking the second application in response to the operation on the interface of the first application includes:
  operating the user terminal jump anchor or link; and
  jumping from a current interface of a corresponding user terminal to the audio playing application.

According to one or more embodiments of the present disclosure, before the respond to the operation on the interface of the first application, it further includes:
  If the second application does not have the copyright license to play the target audio, the target audio playing control will be hidden or presented in gray.

According to one or more embodiments of the present disclosure, the determining that the second application has the copyright license to play the target audio includes:
  acquiring the audio in the multimedia;
  determining an identifier of the target audio according to the audio; and
  determining that the target audio is in a licensed audio library of the second application according to the identifier.

According to one or more embodiments of the present disclosure, before playing the target audio using the second application, it further includes:
  obtaining an application installation list on a user side;
  determining whether the second application is in the installation list and,
  if yes, send the identifier of the target audio to the second application; and
  correspondingly, the playing the target audio using the second application includes:
  loading the target audio in the second application and playing the target audio according to the identifier.

According to one or more embodiments of the present disclosure, after the determining whether the second application is in the installation list, it further includes:
  if not, presenting a prompting interface to prompt a user about whether to install the second application;
  if the user confirms to install the second application, automatically downloading and installing the second application.

According to one or more embodiments of the present disclosure, after the determining whether the second application is in the installation list, it further includes:
  if not, launching an applet of the second application via the first application; and
  playing the target audio in the applet.

According to one or more embodiments of the present disclosure, the target audio playing control includes an icon for presenting at least one attribute of the target audio, the attribute including at least one of: number of likes, number of plays, album, popularity, ranking, lyrics and/or music by, and performer.

According to one or more embodiments of the present disclosure, the icon is further used to present the characteristic attribute of the target audio by at least one of: color, shape, and number of icons, where the characteristic attribute includes: sound quality and category.

According to one or more embodiments of the present disclosure, the first application is a program including a short video playing application, and the second application includes an audio playing application.

According to one or more embodiments of the present disclosure, the multimedia includes at least one of: audio, video, short video, text material including background music, and web page contents including audio and/or video.

According to one or more embodiments of the present disclosure, the interface of the first application is a search interface for multimedia.

In a second aspect, according to one or more embodiments of the present disclosure, an audio playing apparatus is provided, including:
  an acquiring module, configured to acquire an operating instruction on an interface of a first application, where the interface is used to present an audio in a multimedia, and the multimedia includes an information set that includes an audio and other non-audio media;
  a processing module, configured to invoke a second application in response to the operating instruction; and
  the processing module is further configured to play a target audio using the second application, where the target audio has a corresponding relationship with the audio in the multimedia.

According to one or more embodiments of the present disclosure, the processing module is configured to invoke the second application, including: invoking the second application in a backend of a user side.

According to one or more embodiments of the present disclosure, the processing module is configured to invoke the second application, including: jumping to the second application.

According to one or more embodiments of the present disclosure, the interface includes a multimedia presenting area and a target audio playing control, the multimedia presenting area is used to present at least one of the multimedia, and the operating instruction includes: operating instruction corresponding to operating the target audio playing control.

According to one or more embodiments of the present disclosure, before the processing module is configured to respond to the operating instruction, it further includes:
the processing module is further configured to determine that the second application has the copyright license to play the target audio.

According to one or more embodiments of the present disclosure, after the processing module is further configured to determine that the second application has the copyright license to play the target audio, it further includes:
the processing module is further configured to present the target audio playing control on the interface of the first application.

According to one or more embodiments of the present disclosure, the processing module is further configured to present the target audio playing control, including:
highlighting the target audio playing control; or
flashing the target audio playing control at a preset frequency; or
presenting the target audio playing control during a preset interval, and hiding the target audio playing control when the preset interval expires; or
cyclically presenting relevant attribute information of the target audio according to a preset order.

According to one or more embodiments of the present disclosure, when the second application includes at least two audio playing applications, the target audio playing control includes a jump anchor or link for each of the audio playing applications.

According to one or more embodiments of the present disclosure, each of the audio playing applications is installed on a different user terminal, and the processing module is configured to invoke a second application in response to the operating instruction, including:
operating the jump anchor or the link corresponding to the audio playing application; and
jumping from a current interface of a corresponding user terminal to the audio playing application.

According to one or more embodiments of the present disclosure, the target audio playing control includes multiple user terminal jump anchors or links, each user terminal is installed with the second application, and the processing module is configured to invoke a second application in response to the operating instruction, including:
operating the user terminal jump anchor or link; and
jumping from a current interface of a corresponding user terminal to the audio playing application.

According to one or more embodiments of the present disclosure, before the processing module is configured to respond to the operating instruction, it further includes:
If the second application does not have the copyright license to play the target audio, the processing module is further configured to hide the target audio playing control or present the target audio playing control in gray.

According to one or more embodiments of the present disclosure, the processing module is further configured to determine that the second application has the copyright license to play the target audio, including:
the acquiring module is further configured to acquire the audio in the multimedia;
the processing module is further configured to determine the identifier of the target audio according to the audio;
the processing module is further configured to determine that the target audio is in a licensed audio library of the second application according to the identifier.

According to one or more embodiments of the present disclosure, before the processing module is further configured to play the target audio using the second application, it further includes:
the processing module is further configured to obtain an application installation list on a user side;
the processing module is further configured determine whether the second application is in the installation list and,
if yes, send the identifier of the target audio to the second application; and
Correspondingly, the processing module is further configured to play the target audio second application, including:
the processing module is further configured to load the target audio in the second application and play the target audio according to the identifier.

According to one or more embodiments of the present disclosure, after the determining whether the second application is in the installation list, it further includes:
if not, the processing module is further configured to present a prompting interface to prompt a user about whether to install the second application;
if the user determines to install the second application, the processing module is further configured to automatically download and install the second application.

According to one or more embodiments of the present disclosure, after the processing module is further configured to determine whether the second application is in the installation list, it further includes:
if not, the processing module is further configured to launch an applet of the second application through the first application; and play the target audio in the applet.

According to one or more embodiments of the present disclosure, the target audio playing control includes an icon for presenting at least one attribute of the target audio, the attribute including at least one of: number of likes, number of plays, album, popularity, ranking, lyrics and/or music by, and performer.

According to one or more embodiments of the present disclosure, the icon is further used to present the characteristic attribute of the target audio by at least one of: color, shape, and number of icons, where the characteristic attribute includes: sound quality and category.

According to one or more embodiments of the present disclosure, the first application is a program including a short video playing application, and the second application includes an audio playing application.

According to one or more embodiments of the present disclosure, the multimedia includes at least one of: audio, video, short video, text material including background music, and web page contents including audio and/or video.

According to one or more embodiments of the present disclosure, the interface of the first application is a search interface for multimedia.

In a third aspect, according to one or more embodiments of the present disclosure, an electronic device is provided, including:

at least one processor; and a memory, where
the memory stores computer executable instructions; and
the at least one processor executes the computer-executable instructions stored in the memory to enable the at least one processor to execute the audio playing method according to the above first aspect and various possible designs thereof.

In a fourth aspect, according to one or more embodiments of the present disclosure, a computer-readable storage medium is provided, storing thereon computer-executable instructions which, when being executed by a processor, implement the audio playing method according to the above first aspect and various possible designs thereof.

In a fifth aspect, according to one or more embodiments of the present disclosure, a computer program product is provided, including a computer program stored in a computer readable storage medium, and at least one processor of an electronic device is enabled to read from the computer readable storage medium the computer program which, when executed by the at least one processor, enables the at least one processor to implement the audio playing method according to the above first aspect and various possible designs thereof.

In a sixth, aspect according to one or more embodiments of the present disclosure, a computer program stored in a computer-readable storage medium is provided, and at least one processor of a device is enabled to read the computer program from the computer-readable storage medium. The at least one processor executes the computer program to enable the at least one processor to execute the audio playing method according to the above first aspect and various possible designs thereof.

The above descriptions are only preferred embodiments of the present disclosure and explanations of the applied technical principles. Those skilled in the art should understand that the scope of disclosure involved in the present disclosure is not limited to the technical solutions formed by the specific combinations of the above technical features. Rather, other technical solutions formed by any combination of the above technical features or the equivalent features thereof without departing from the above disclosed concepts should also be covered. These may include, for example, technical solutions formed by replacing the above-mentioned features with other technical features disclosed in (but not limited to) the present disclosure having similar functions.

In addition, although various operations have been described in a specific order, this should not be understood as requiring these operations to be performed in the specific order shown or performed in a sequential order. Under certain circumstances, multitasking and parallel processing may be advantageous. Likewise, although several specific implementation details have been included in the above discussions, this should not be construed as limiting the scope of the present disclosure. Certain features that are described in the context of separate embodiments can also be implemented in combination in a single embodiment. Conversely, various features described in the context of a single embodiment can also be implemented individually or in any suitable sub-combinations in multiple embodiments.

Although the subject matter has been described in languages specific to structural features and/or logical actions of the methods, it should be understood that the subject matter defined in the appended claims is not necessarily limited to the particular features or actions described above. On the contrary, the particular features and actions described above are merely exemplary forms of implementing the claims.

What is claimed is:

1. An audio playing method, comprising:
invoking a second application in response to an operation on an interface of a first application, wherein the interface is used to present a multimedia, and the multimedia comprises an information set that comprises an audio and other non-audio media; and
playing a target audio using the second application, wherein the target audio has a corresponding relationship with the audio in the multimedia;
the audio playing method further comprising:
acquiring an audio in the multimedia being shown on the first application;
determining an identifier of the target audio according to the audio;
determining whether the target audio is in a licensed audio library of the second application according to the identifier;
based on determining the target audio is in the licensed audio library of the second application, presenting a target audio playing control on the interface of the first application, and
based on determining the target audio is not in the licensed audio library of the second application, hiding the target audio playing control or presenting the target audio playing control in grey on the interface of the first application,
wherein the operation on the interface of the first application comprises: operating the target audio playing control, and
wherein the identifier is information attached to the target audio or fingerprint feature of the target audio.

2. The audio playing method according to claim 1, wherein the interface comprises a multimedia presenting area, wherein the multimedia presenting area is used to present at least one of the multimedia.

3. The audio playing method according to claim 2, wherein the presenting a target audio playing control on the interface of the first application comprises at least one of:
highlighting the target audio playing control in the interface;
flashing the target audio playing control in the interface at a preset frequency;
presenting the target audio playing control in the interface during a preset interval, and hiding the target audio playing control when the preset interval expires; and
cyclically presenting, in the interface, relevant attribute information of the target audio according to a preset order.

4. The audio playing method according to claim 2, wherein in response to the second application comprises at least two audio playing applications, the target audio playing control comprises a jump anchor or a link for each of the audio playing applications.

5. The audio playing method according to claim 4, wherein each of the audio playing applications is installed on a different user terminal, and invoking the second application in response to the operation on the interface of the first application comprises: operating the jump anchor or the link corresponding to one of the audio playing applications; and jumping from a current interface of a corresponding user terminal to a corresponding audio playing application.

6. The audio playing method according to claim 4, wherein a number of the target audio playing controls is equal to a number of the target audios.

7. The audio playing method according to claim 2, wherein the target audio playing control comprises multiple user terminal jump anchors or links, and each user terminal is installed with the second application, and the invoking the second application in response to the operation on the interface of the first application comprises:
   operating one of the multiple user terminal jump anchors or links; and
   jumping from a current interface of a corresponding user terminal to an audio playing application in the second application.

8. The audio playing method according to claim 2, wherein the target audio playing control comprises an icon for presenting at least one attribute of the target audio, the at least one attribute including at least one of: number of likes, number of plays, album, popularity, ranking, lyrics and/or music by, and performer.

9. The audio playing method according to claim 8, wherein the icon is further used to present a characteristic attribute of the target audio by at least one of: color, shape, and number of icons, wherein the characteristic attribute comprises: sound quality and category.

10. The audio playing method according to claim 1, wherein before playing the target audio in the second application, the method further comprises:
    obtaining an application installation list on a user side;
    determining whether the second application is in the installation list; and
    based on determining the second application is in the installation list, sending an identifier of the target audio to the second application; and
    correspondingly, playing the target audio in the second application comprises:
    playing the target audio in the second application according to the identifier.

11. The audio playing method according to claim 10, wherein after the determining whether the second application is in the installation list, the method further comprises:
    based on determining the second application is not in the installation list, presenting a prompting interface to prompt a user about whether to install the second application; and
    based on determining the user confirms to install the second application, automatically downloading and installing the second application.

12. The audio playing method according to claim 10, wherein after the determining whether the second application is in the installation list, the method further comprises:
    based on determining the second application is not in the installation list, launching an applet of the second application via the first application; and
    playing the target audio in the applet.

13. The audio playing method according to claim 1, wherein the first application is a program that comprises a video playing application, and the second application comprises an audio playing application.

14. The audio playing method according to claim 1, wherein the multimedia comprises at least one of: audio, video, text material including background music, and web page contents including audio and/or video.

15. The audio playing method according to claim 1, wherein the interface of the first application is a search interface for the multimedia.

16. The audio playing method according to claim 1, wherein the invoking a second application in response to an operation on an interface of a first application comprises invoking, in response to a first operating mode of operating the target audio playing control, the second application in a backend of a user side to play the target audio, and at a same time, turning off an audio output in the first application and continuing to present the other non-audio media of the multimedia on the interface of the first application; wherein a current interface on the user side remains in the first application when playing the target audio.

17. The audio playing method according to claim 1, wherein the presenting a target audio playing control on the interface of the first application further comprises:
    presenting the target audio playing control on the interface of the first application, when the interface of the first application pauses playing the multimedia; or
    presenting the target audio playing control on the interface of the first application, when the multimedia or the audio in the multimedia shown on the interface has been repeatedly played for a preset number of times.

18. The audio playing method according to claim 1, wherein the presenting the target audio playing control in grey on the interface of the first application comprises:
    acquiring information of the target audio in response to an operation on the target audio playing control from a user.

19. An electronic device, comprising:
    at least one processor; and
    a memory having computer executable instructions which, when executed by the at least one processor, enables the at least one processor to:
    invoke a second application in response to an operation on an interface of a first application, wherein the interface is used to present a multimedia, and the multimedia comprises an information set that comprises an audio and other non-audio media; and
    play a target audio using the second application, wherein the target audio has a corresponding relationship with the audio in the multimedia;
    acquire an audio in the multimedia being shown on the first application;
    determine an identifier of the target audio according to the audio;
    determine whether the target audio is in a licensed audio library of the second application according to the identifier;
    based on determining the target audio is in the licensed audio library of the second application, present a target audio playing control on the interface of the first application, and
    based on determining the target audio is not in the licensed audio library of the second application, hide the target audio playing control or present the target audio playing control in grey on the interface of the first application,
    wherein the operation on the interface of the first application comprises: operating the target audio playing control, and
    wherein the identifier is information attached to the target audio or fingerprint feature of the target audio.

20. A computer-readable storage medium, storing thereon computer-executable instructions which, when being executed by a processor, implement the following:
    invoking a second application in response to an operation on an interface of a first application, wherein the interface is used to present a multimedia, and the multimedia comprises an information set that comprises an audio and other non-audio media; and playing a target audio using the second application, wherein the target audio has a corresponding relationship with the audio in the multimedia;

acquiring an audio in the multimedia being shown on the first application;

determining an identifier of the target audio according to the audio;

determining whether the target audio is in a licensed audio library of the second application according to the identifier;

based on determining the target audio is in the licensed audio library of the second application, presenting a target audio playing control on the interface of the first application, and based on determining the target audio is not in the licensed audio library of the second application, hiding the target audio playing control or presenting the target audio playing control in grey on the interface of the first application, wherein the operation on the interface of the first application comprises: operating the target audio playing control, and wherein the identifier is information attached to the target audio or fingerprint feature of the target audio.

* * * * *